United States Patent [19]
Lee et al.

[11] Patent Number: 5,485,630
[45] Date of Patent: Jan. 16, 1996

[54] AUDIO/VIDEO DISTRIBUTION SYSTEM

[75] Inventors: Xiaoyang Lee, New York, N.Y.; Steve Lam, Cranbury, N.J.

[73] Assignee: Panasonic Technologies, Inc., Princeton, N.J.

[21] Appl. No.: 221,091

[22] Filed: Mar. 31, 1994

[51] Int. Cl.⁶ .............................. H04N 7/10; H04H 1/00
[52] U.S. Cl. ................................. 455/4.1; 348/8; 348/12
[58] Field of Search ...................... 340/825.22; 455/6.3, 455/6.1, 4.1; 375/36; 358/86; 348/8, 12, 13; H04N 7/10; H04H 1/100

[56] References Cited

U.S. PATENT DOCUMENTS

| | | |
|---|---|---|
| 4,450,481 | 5/1984 | Dickinson . |
| 4,745,392 | 5/1988 | Ise et al. . |
| 4,864,632 | 9/1989 | Moriyama et al. . |
| 4,899,217 | 2/1990 | MacFadyen et al. . |
| 4,907,079 | 3/1990 | Turner et al. . |
| 4,910,791 | 3/1990 | Dickinson et al. . |
| 4,959,713 | 9/1990 | Morotomi et al. . |
| 4,987,492 | 1/1991 | Stults et al. . |
| 4,989,081 | 1/1991 | Miyagawa et al. . |
| 4,994,908 | 2/1991 | Kuban et al. . |
| 5,051,720 | 9/1991 | Kittirutsunetorn . |
| 5,057,829 | 10/1991 | Velazquez . |
| 5,077,607 | 12/1991 | Johnson et al. . |
| 5,101,191 | 3/1992 | MacFadyen et al. . |
| 5,161,021 | 11/1992 | Tsai . |
| 5,187,803 | 2/1993 | Sohner et al. ................ 455/4.1 |
| 5,193,208 | 3/1993 | Yokota et al. . |
| 5,210,518 | 5/1993 | Graham et al. . |
| 5,214,505 | 5/1993 | Rabowsky et al. . |
| 5,218,552 | 6/1993 | Stirk et al. . |
| 5,218,714 | 6/1993 | Ishibashi et al. . |

FOREIGN PATENT DOCUMENTS 0369382  5/1990  European Pat. Off. .

OTHER PUBLICATIONS

Microelectronics Circuits 3rd Edition; Sedra/Smith pp. 62–63.

J. Hoffman "The Consumer Electronic Bus: An Integrated Multi–Media Lan for the Home", *International Journal of Digital and Analog Communication Systems*, vol. 4, pp. 77–86 (1991).

"IS–60.3 Physical Layer and Media Specifications; Part 3–CX Physical Layer & Media Specification", *CX Specification*, Revised Mar. 19, 1992, Table of Contents & pp. 1–41.

"2.4 The SMART HOUSE Development Venture", Home Automation 89, 1989 Parks Associates, pp. 36–45.

(List continued on next page.)

*Primary Examiner*—Victor R. Kostak
*Assistant Examiner*—Juan G. Acosta
*Attorney, Agent, or Firm*—Ratner & Prestia

[57] ABSTRACT

A Node "0" device for a Consumer Electronics Coaxial Bus (CXBUS) network is provided. The network has a plurality of internal cables coupled to a source of up-link signals located within a first frequency band. The up-link signals include first audio/video (A/V) signals (which may be digital or analog) and control signals. External cables provide second A/V signals located within a second frequency band. An active input section is coupled to the internal cables. The input section individually filters and amplifies the up-link signals and combines the amplified signals. The input section provides a down-link signal path. A block converter coupled to the input section converts the first A/V signal from the first frequency band to the second frequency band, and provides the converted signals at its output port. A control channel regenerator coupled to the input section receives the control signal, generates a down-link control signal, and transmits the down-link control signal to the input section. An external cable distribution section is coupled to the external cables and to the source of second A/V signals. The external cable distribution section receives either the converted signals, the second A/V signals or both, and transmits the received signals to the external cables.

11 Claims, 10 Drawing Sheets

OTHER PUBLICATIONS

Ken Davidson, "Echelon's Local Operating Network", Home Automation, *Circuit Cellar Ink,* Jun./Jul. 1991, pp. 74–77.

Chart: "SMART HOUSE and CEBus", FIG. 2–17, 1989 Parks Associates.

T. E. O'Brien, Jr., "Physical and Media Specifications of the CXBus", *IEEE Transactions on Consumer Electronics,* vol. 37, No. 3, Aug. 1991, pp. 357–366.

5,485,630

AUDIO/VIDEO DISTRIBUTION SYSTEM

FIELD OF THE INVENTION

This invention relates to audio/video distribution systems. More specifically, it relates to the topology and the implementation of the Node "0" of a Coaxial Bus (CXBus) network.

BACKGROUND OF THE INVENTION

The CXBus network provides the information necessary to facilitate the exchange of data and control information over the coax medium within a home. The detailed description of the CXBus network may be found in the "CX Specification, IS-60.3 Coax Physical Layer and Media Specifications", revised Mar. 19, 1992, which is incorporated herein by reference for its teachings on CXBus topologies, media and devices, including Node "0" definition. CXBus is also described in O'Brien Jr., "Physical and media specifications of the CXBus", IEEE Transactions on Consumer Electronics, Vol. 37, Number 3, August, 1991, which is incorporated by reference herein for its teachings on CXBus networks. A publication by J. Hofmann entitled "The Consumer Electronic Bus: an Integrated Multi-Media LAN for the Home", International Journal of Digital and Analog Communication Systems, Vol. 4, 77–86, (1991), (which is incorporated herein by reference for its teachings on CEBus network architectures) describes issues related to frequency placement of block converted signals.

The Consumer Electronic Bus (CEBus) is a multimedia LAN standard for use by the Electronics Industry Association's Consumer Electronics Bus Committee. CEBus provides a standard communications interface to each of six different media. These media include: PLBus (Power Line Bus), TPBus (Twisted-Pair Bus), CXBus (Coaxial Bus), IRBus (Infrared Bus), RFBus (Radio Frequency Bus) and FOBus (Fiber-Optic Bus). CEBus comprises media with data channels and a control channel. The control channel carries commands used to allocate the data channels, as well as short messages. The data channels carry a variety of signals which do not fit within the bandwidth constraints of the control channel. The control channel is digital, whereas the data channels may carry signals of any type.

CXBus network configurations support all anticipated coax connected appliances in the home. The CXBus distribution system includes a collection of coaxial cable pairs that originate at a special node distribution device called Node "0" 800, as shown in FIG. 8. This dual cable approach provides sufficient spectrum space for externally generated signals from either a Cable Television (CATV) cable or Off-Air (i.e., from an outside antenna), as well as the video and audio signals generated within the home (e.g., from a video cassette recorders or surveillance cameras). The two cables of this cable pair are described as "external" cable and "internal" cable respectively.

The CXBuS network may be a single independent network. The CXBus network may also be interconnected with other CXBus networks or different CEBus media by using a Router, Bridge or Brouter.

FIG. 10 is a block diagram of a conventional Node "0" 800. The CXBus network consists of one or more coaxial cable pairs attached at Node "0" 800 and terminated by a 4-way splitter/combiner 822. The Node "0" 800 of FIG. 10 includes circuitry to provide the following functions:

1. An input function 802 for combining signals from Internal cable branches and for distributing signals to the internal cable branches.

2. A block converter 804 for block frequency conversion of data channel signals 806 for distribution back onto the Internal cable (not shown) via input function 802 or External cable (not shown) via external cable output function 808.

3. An amplifier 812 that amplifies the block converted data channel signals 810 to drive the required number of External cable or Internal cable branches, overcoming the losses of splitters and cables to deliver the required signal strength to the distribution device.

4. A CATV/Off-Air function 814 that provides the filtering and amplification needed for distributing CATV or Off-Air television signals.

5. A control channel regenerator 816 that receives the 5.5 MHz signal, demodulates the signal, modulates a control channel signal on a 4.5 MHz channel, and provides the 4.5 MHz control channel at sufficient signal strength on all Internal cables.

6. A Node "0" device may also provide a CATV signal return path for two-way cable services as shown in FIG. 10.

High quality audio/video distribution is one of the important features of the CXBus network. The quality of the distributed video signal in the CXBus network is heavily influenced by the following five factors:

1. The Signal/Noise (S/N) ratio of the video source which is used in the network;

2. the Carrier/Noise (C/N) ratio of the output signal from any modulator which generates signals to be distributed on the CXBus;

3. the signal level that is allowed to be placed on the network;

4. the topology of the CXBus network; and 5. the noise figure of the Node "0".

The C/N ratio (RF video carrier to noise power ratio) is one of the major parameters considered when evaluating the quality of CATV distribution system. This noise component depends on the quality of the modulators used for the internal sources. The C/N ratio may be reduced by changing the signal source. There is one noise component, however, that cannot be reduced. The irreducible noise is the thermal noise. For a TV channel signal with an ideal 75 ohm impedance and 4 MHz bandwidth, the irreducible noise level is about −59 dBmV at room temperature 70° F.

For the CXBus network, the in-home generated audio/video signals are block converted by Node "0" 800, and the block converted signals may be fed back from the internal cable or external cable.

In most current cable systems, channels are allocated below 450 MHz, leaving the High band between 450 and 546 MHz open for carrying block converted signals over the external cable. This allows internally generated signals to be rebroadcast by Node "0" over the external cable. Devices throughout the CXBus network may receive signals on the external cable from either the CATV or from the internal signal source (e.g., VCR without switching the devices from the external cable to the internal cable.

The inventors have determined that, if the nominal signal level $S_{rec}$ received at the device (e.g. TV) is +4 dBmV, the required output signal level from the block converter $S_{BLOCK}$ (considering only 4 coaxial cable pairs being driven by this Node "0" 800) is +29 dBmV.

When the block converted signals 810 are fed back to the internal cable input section 802, this +29 dBmV signal leaks into the input of the block converter 804 through the 2-way splitter/combiner 818 and becomes extra noise relative to the signal 806 coming from the device sources (e.g., a Video Cassette Recorder, VCR). It is necessary to add an additional band pass filter 820 in front of the block converter 804, but this causes additional signal loss, lowering the C/N ratio.

Because the passive splitter/combiner 822 is used at the input 802 of the Node "0" 800, the signal level 806 decreases when the number of coaxial cable pairs attached at Node "0" increases. This means that the quality of the distributed video signal 824 decreases rapidly if the size of the CXBus network expands.

Based on the above design considerations, if the block converter 804 has a 4.0 dB noise figure, and only 4 coaxial cable pairs are attached at Node "0" 800, then the maximum achievable C/N ratio at the output port of the block converter 804 is worse than 36 dB even with a perfect noiseless video source and TV modulator. The relation between the C/N ratio (without modulation) and the picture quality is shown in Table 1.

TABLE 1

| C/N Ratio (dB) | Picture Quality |
| --- | --- |
| over 42 dB | Excellent |
| 40 dB–42 dB | Good–Excellent |
| 38 dB–40 dB | Fair–Good |
| 36 dB–38 dB | Passable–Fair |
| 34 dB–36 dB | Objectionable–Passable |
| under 34 dB | Unusable |

Based on table 1, a Node "0" 800 having a conventional passive input section is not practical for distributing a video signal through the CXBus network. The quality of the picture from the video signals provided by Node "0" 800 is marginal at best.

In order to provide a CXBus network that is able to distribute high quality audio/video signals, a very low noise figure for Node "0" is desired.

SUMMARY OF THE INVENTION

The invention is a signal distribution subsystem adapted for use in a Node "0" device within a Coaxial Bus network. The network includes a plurality of internal cables coupled to a source of up-link signals located within a first frequency band. The up-link signals include audio/video signals and control channel signals.

The distribution subsystem comprises an active input section coupled to the plurality of internal cables. The active input section individually filters and amplifies the respective up-link signals provided by the plurality of cables, and combines the up-link signals.

A block converter is coupled to the active input section for receiving and converting the audio-video signals from the first frequency band to a second frequency band, and for transmitting the converted signals to the active input section.

A control channel regenerator is coupled to the active input section for: (1) receiving the control channel signal, (2) generating a down-link control channel signal, and (3) transmitting the down-link control channel signal back through the active input section. The converted signals and the down-link control channel signals are transmitted to the internal cables by the active input section.

OVERVIEW

Figure 1:
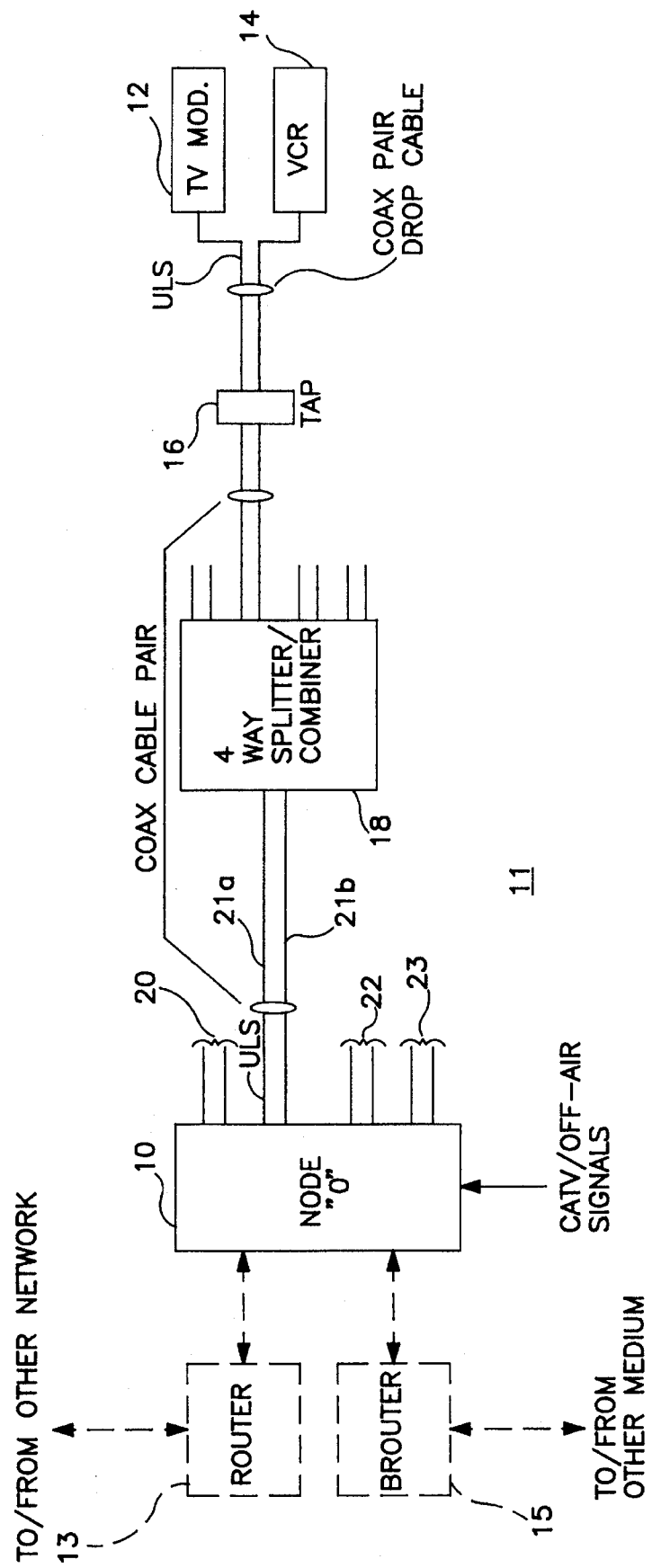
FIG. 1 is a block diagram of an exemplary CXBus network including a Node "0" in accordance with the invention.
Figure 2:
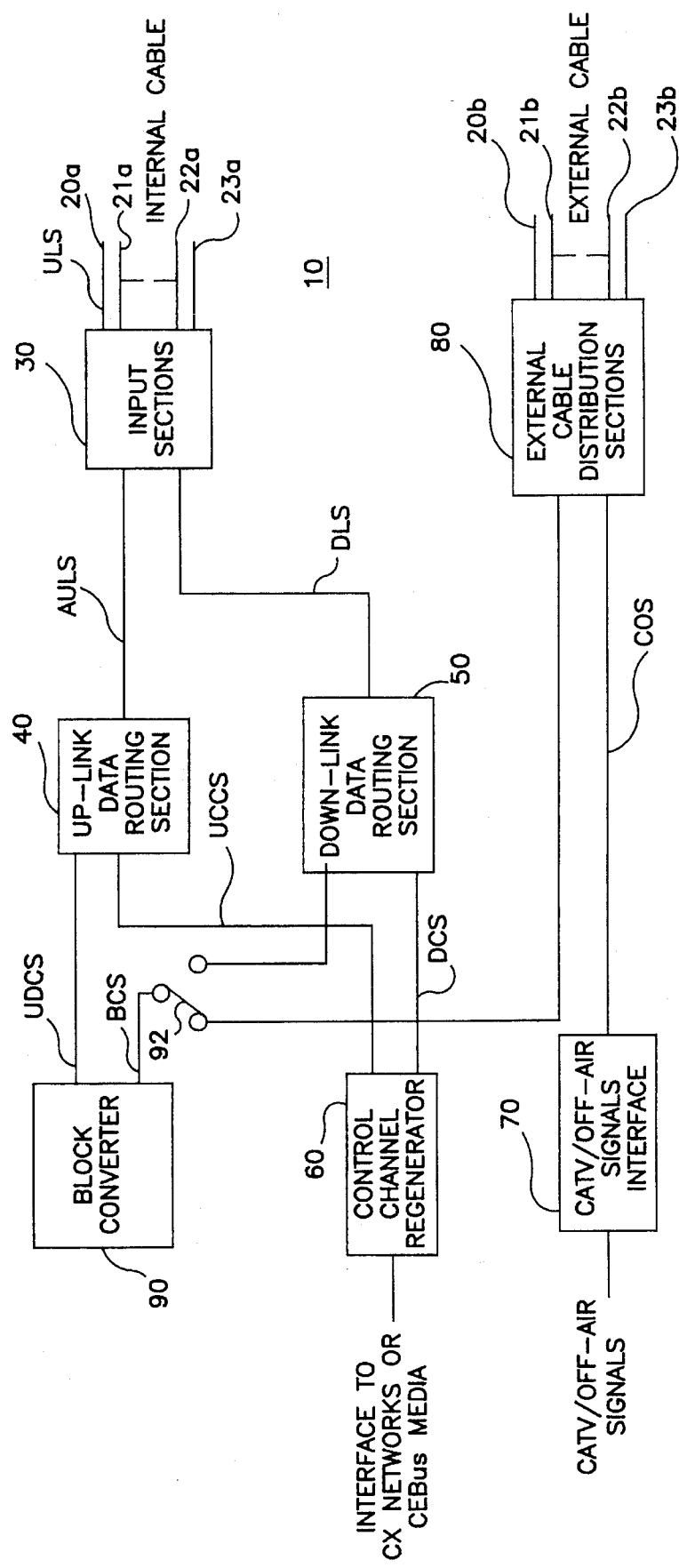
FIG. 2 is a block diagram of the exemplary Node "0" device shown in FIG. 1.
Figure 3:
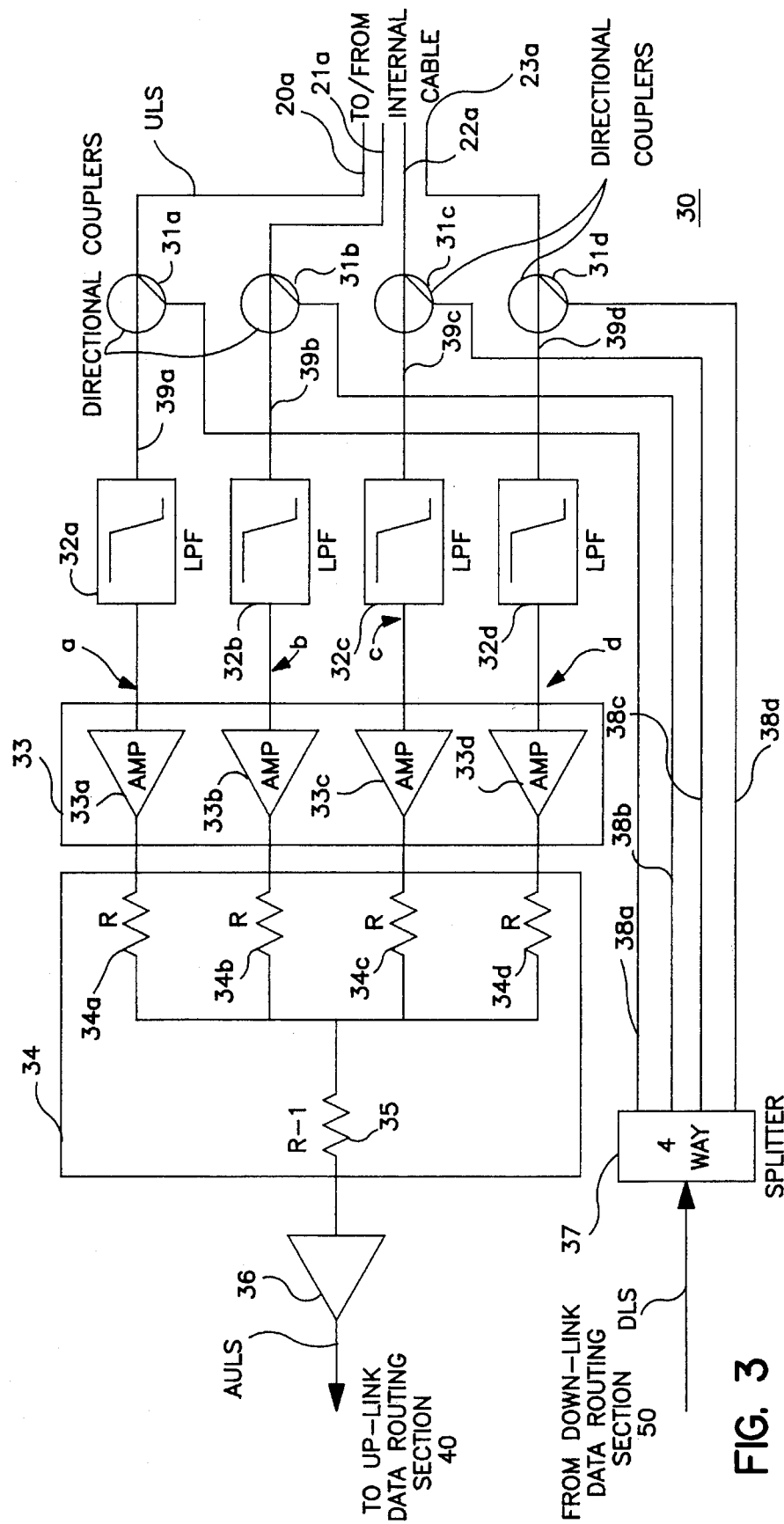
FIG. 3 is a block diagram of the input section of the Node "0" shown in FIG. 2.

Reference is first made to FIGS. 1-3. FIG. 1 is a block diagram of an exemplary CXBus network 11 including a Node "0" 10 in accordance with the invention. FIG. 2 is a block diagram of the exemplary Node "0" device 10 shown in FIG. 1. FIG. 3 is a block diagram of the input section of the Node "0" shown in FIG. 2.

The following two terms are defined herein as follows:

Up-link—The link from a device, such as device 12 to Node "0" 10.

Down-link—The link from Node "0" 10 to a device, such as device 12.

Referring to FIG. 1, the CXBus network 11 includes a plurality of coaxial cable pairs 20–23. Only one of the pairs 21 is shown in detail; it comprises an internal cable 21a and an external cable 21b. The remaining pairs 20, 22 and 23 are identical to pair 21a, 21b. Hereafter, the description only refers to internal cable 21a and external cable 21b. It is understood that the description of connections to the remaining cable pairs 20, 22 and 23 would be identical. Each cable pair 20–23 connects the Node "0" to a respective 4-way splitter/combiner 18. Although only 4 pairs 20–23 are shown in .FIG. 1, additional pairs may be included, as described below with reference to FIGS. 2 and 3.

The in-home generated up-link audio/video signals (ULS) are allocated in the data channel transmitting band (54 MHz–150 MHz). The ULS are placed on the internal cable 21a through a tap 16. The ULS are produced by devices, such as television modulator 12 or VCR 14. It is understood that there may be a variety of device types, and that the number of devices coupled to the Node "0" 10 may be large. The up-link audio/video signals ULS may include a variety of data, including but not limited to:

1. Audio/video programs;
2. Video menu information distributed to a plurality of terminals within the home;
3. Displays from interactive multi-media programs;

4. Video signals from surveillance cameras; and

5. Voice Signals.

The ULS signal is transmitted to the Node "0" 10, where it is block converted to the high band (450 MHz –546 MHz) or low band (324 MHz–420 MHz). The block converted data channel signals (BCS) may be combined with CATV/Off-Air signals COS within Node "0" 10 and fed back to the external cable 21b. Alternatively, the BCS may be fed back to the internal cable 21a.

If the local CATV system does not broadcast above 450 MHz (as is true for most current CATV systems in operation), it is desirable to distribute the BCS signals over the external cable 21b. The network user may then watch/listen to programming from both in-home and externally generated signals transmitted over the external cable 21b, without switching the Node "0" to route the BCS over the internal cable 21a.

If the CATV signal is placed on the CXBus network 11, block converted data channel signals BCS in the high band (450 MHz–546 MHz) are combined with the CATV signals and fed back to external cable 21b. If the Off-Air signal is placed on the CXBus network 11 BCS signals in the low band (324 MHz–420 MHz) are combined with the Off-Air signals and fed back to the external cable 21b.

In the future, it is contemplated that the CATV industry will broadcast signals having frequencies between 450 MHz and 1 GHz. To. accommodate the presence of these additional external signals, the BCS may be routed by a switch 92 (shown in FIG. 2) to the Input Sections 30 for transmission over the internal cables. The BCS signals may then be transmitted back over the Internal cable 21a on the high band (450–546 MHz).

The control channel signals occupy reserved bandwidth between 4 MHz and 6 MHz, and use an amplitude modulated RF carrier. Coax-connected devices 12 and 14 transmit an up-link control channel signal UCCS on a center frequency of 5.5 MHz and receive the retransmitted signal DCS at a center frequency of 4.5 MHz. This retransmitted control channel signal DCS is regenerated by the Node "0" 10.

According to the invention, the Node "0" 10 includes an active input section 30 (shown in FIGS. 2 and 3) coupled to the plurality of internal cables 20a–23a. Input Section 30 provides a mechanism for receiving, filtering, amplifying and combining the up-link signals ULS, and for providing down-link signals. As described below with reference to FIG. 3, the filters 32a–32d remove noise from the up-link signal ULS and prevent the block converted down-link signal DLS from being passed, with the up-link signal ULS to the block converter 90, thereby providing an additional source of noise. The filtered up-link signals are amplified before they are combined, so that the C/N ratio of the signal is improved. Once the filtered signal is amplified in a first amplifier stage 33 (having high gain and low noise figure), a simple resistive network 34 may be used to combine the signals from multiple channels without excessive degradation in the C/N ratio. The combined signal then is passed through a second stage amplifier 36.

According to another aspect of the invention, the input section 30 of Node "0" 10 provides a low insertion loss for the in-home generated audio/video signals (up-link signals, or ULS) and control channel signal. Input section 30 also provides a suitable signal path for the regenerated control channel signal (DCS) and the block converted data channel signals (BCS).

Referring now to FIG. 2, a Block Converter 90 is coupled to the input section 30 for receiving and converting the first audio/video signal component UDCS of the up-link signal ULS from the first frequency band to the second frequency band. The Block Converter 90 provides the converted signals BCS at its output port.

A control channel regenerator 60 is coupled to the input section 30, The control channel regenerator performs the functions of: (1) receiving the control channel signal UCCS; (2) generating a down-link control channel signal DCS which may include the up-link control channel signal UCCS; and (3) transmitting the down-link control channel signal DCS to the input section 30, The up-link signals ULS originate at a device in the building in which the Node "0" 10 is located. The device may be a television modulator 12, a video cassette recorder 14, or other device that produces a wide-band output signal. The up-link signals ULS are transmitted to the Input Sections block 30, where they are amplified and combined. The amplified up-link signals AULS are then transmitted to an Up-link Data Routing Section 40. The Up-link Data Routing Section 40 separates the amplified up-link signals AULS into up-link control channel signal UCCS and up-link data channel signals UDCS.

The up-link control channel signal UCCS (the 5.5 MHz signal) is transmitted into the Control Channel Regenerator 60, The up-link data channel signals UDCS (which occupy the 54 MHz–150 MHz band) are fed into the Block Converter 90, The Block Converter 90 relocates the up-link data channel signals to the high (450 MHz–546 MHz) band or low (324 MHz–420 MHz) band.

Two different distribution mechanisms are provided, through the use of a switch 92. When the switch 92 is in a first position (as shown in FIG. 2), the Block Converted Output Signals BCS are provided to the External Cable Distribution Sections 80, for distribution to the devices connected to the CXBus via the external cables 20b–23b. When the switch 92 is in a second position, the Block Converted Output Signals BCS are provided to the Down-link Data Routing Section 50 for distribution via the internal cables 20a–23a.

First, if the in-home generated data channel signals are to be distributed via the external cable 20b–23b, then the frequency band to which the block converter 90 relocates the up-link data channel signals UDCS is determined by the choice of which external signals are connected into the home (As described with reference to FIG. 7, a switch 76 transmits either CATV or Off-Air signals at any given time). Referring again to FIG. 2, if Off-Air signals are being transmitted into the home, the up-link data channel signals UDCS are placed in the low band (from 324 MHz–420 MHz) by the block converter 90. If CATV signals are being-transmitted, the up-link data channel signals UDCS are located in the high band (from 450 MHz to 546 MHz) by the block converter 90. This switching of the band of frequencies used by the block converted signals between the low and high bands is desirable to avoid interference with signals in the received CATV and Off-Air signals, respectively. These block converted signals BCS are fed into the External Cable Distribution Section 80. In the External Cable Distribution Section 80, the in-home generated data channel signals are combined with the signals COS coming from the CATV/Off-Air Signals Interface block 70 and distributed via the external cables 20b–23b.

Secondly, if the block converted signals BCS are to be distributed via the internal cable 20a–23a, then these data channel signals are block converted into the high (450 MHz–546 MHZ) band by the block converter 90, and the block converted signals BCS are routed to the Down-link Data Routing Section 50. In the Down-link Data Routing Section 50, the block converted data channel signals BCS are combined with the down-link control channel signal DCS which is regenerated by the Control Channel Regenerator 60. The down link output signals DLS from the Down-link Data Routing Section 50, are fed back to the Input Sections 30 and distributed via the internal cable 20a–23a. Output signals DLS include the high band down-link data channel signals (450 MHz–546 MHz) and the control channel signal (4.5 MHz).

The Node "0" 10 of the exemplary embodiment of the invention has a low noise figure. A noise figure as low as 5 dB may be achieved using the active input section 30 combined with directional couplers, a signal routing/distributing configuration network 40, and a control channel regenerator 60. The noise figure may be maintained below 6 dB, even when more than 40 coaxial cable pairs (e.g., pairs 20, 22, 23) are attached to the Node "0" 10. This allows high quality audio/video distribution.

The invention provides a high quality audio/video distribution network 11, in which the quality of the distributed video signal does not depend on the number of the coaxial cable pairs attached at Node "0" 10.

The invention provides a high sensitivity control channel signal transceiver within control channel regenerator 60, which can receive the up link control channel signal UCCS and regenerate the down link control channel signal DCS. This regenerated control channel signal DCS is fed back into the internal cable 21a.

The invention allows the CXBus network 11 to be accessed directly by another network via an optional router 13 (shown in FIG. 1) via the control channel signal regenerator 60. The CXBus network 11 may also be accessed directly by another medium via an optional brouter 15 (shown in FIG. 1). Router 13 and Brouter 15 may also connect to the nodes (e.g., TV modulator 12) directly via additional internal cables (not shown).

DETAILED DESCRIPTION OF THE INVENTION

As described with reference to FIGS. 1 and 2, the up-link signals ULS pass through the Input Sections 30 first. FIG. 3 is a detailed block diagram of a single Input Section 30. Depending on the number of devices, Node "0" 10 may include many Input Sections (not shown) identical to Input Section 30. Four coaxial cables 20a–23a may be connected to each Input Section 30. The Input Section 30 is connected to the internal cables 20a–23a only. Each cable 38a–38d from the Input Section 30 is terminated by a 4-way splitter/combiner 18 (shown in FIG. 1). As shown in FIG. 3, Input Section 30 includes four identical branches (having elements labeled a, b, c and d, respectively), a resistive combining network 34, a pre-amplifier 36 and a passive 4-way splitter 37.

Although only the top branch (designated "a") in FIG. 3 is described in detail herein, it is understood that the other branches are identical. That is, items 31a–31d are identical; items 32a–32d are identical; and items 33a–33d are identical.

Branch "a" of the Input Section 30 includes a directional coupler 31a, a low pass filter 32a and a preamplifier 33a. The impedance of the exemplary directional coupler 31a is 75 ohms, and the impedance of the exemplary pre-amplifier 33a is 50 ohms. The directional coupler 31a used for branch a of the Input Section 30 has a worst case maximum pass loss (Lp) of 2 dB, a 6 dB tap loss (LT) and a 75 ohm impedance on all ports. The insulation (L1) between the tap out port 38a and the output port 39a of the directional coupler 31a is about 20 dB–25 dB. Conventional directional couplers manufactured by RMS are suitable for this application.

The low pass filter 32a has two functions. First, low pass filter 32a passes signals having frequencies below 150 MHz, and stops signals having frequencies above 450 MHz. This removes noise from the in-home generated audio/video signals ULS, and also eliminates any portion of the block converted down-link signals DLS that may be added to the Up-link signals ULS (which would saturate the Input Section 30) in directional coupler 31a. The actual insertion loss for the signals below 150 MHz is 0.6 dB and the minimum attenuation for the signals above 450 MHz is 52 dB. Secondly, the low pass filter 32a performs impedance matching between the directional coupler 31a and the preamplifier 33a.

By combining the directional coupler 31a and the low pass filter 32a, each branch of the Input Section 30 passes only the control channel data and in-home generated audio/video data signals to the Up-link Data Routing Section 40. If 20 dB insulation L is assumed between the output port 39a and the tap out port 38a, then the directivity of the Input Section 30 relative to the block converted signals BCS is greater than 72 dB (when the block converted in-home generated audio/video signals BCS are fed back to the internal cable 20a, the distributed signals from the block converter are converted to occupy the high band 450 MHz–546 MHz), and the total loss for the up-link signals (5 MHz–150 MHz) is less than 3 dB.

The pre-amplifier 33a following the low pass filter 32a has a noise figure below 1.8 dB and a gain of more than 31 dB for signals below 200 MHz. The input impedance of the pre-amplifier 33a is 50 ohms. The third order intercept point is +23 dBm at 500 Mhz. This ensures that beating problems among the multiple channel subcarriers do not occur (the third order product is decreased by 3 dB for every 1 dB decrease in the input power).

The equation used for calculating the noise figure is 10 log $(NF_T)$, where $NF_T$ is:

$$NF_T = NF_1 + (NF_2-1)/G_1 + (NF_3-1)/(G_1G_2) + \ldots + (NF_n-1)/(G_1G_2 \ldots G_{n-1}) \qquad (1)$$

Figure 8:
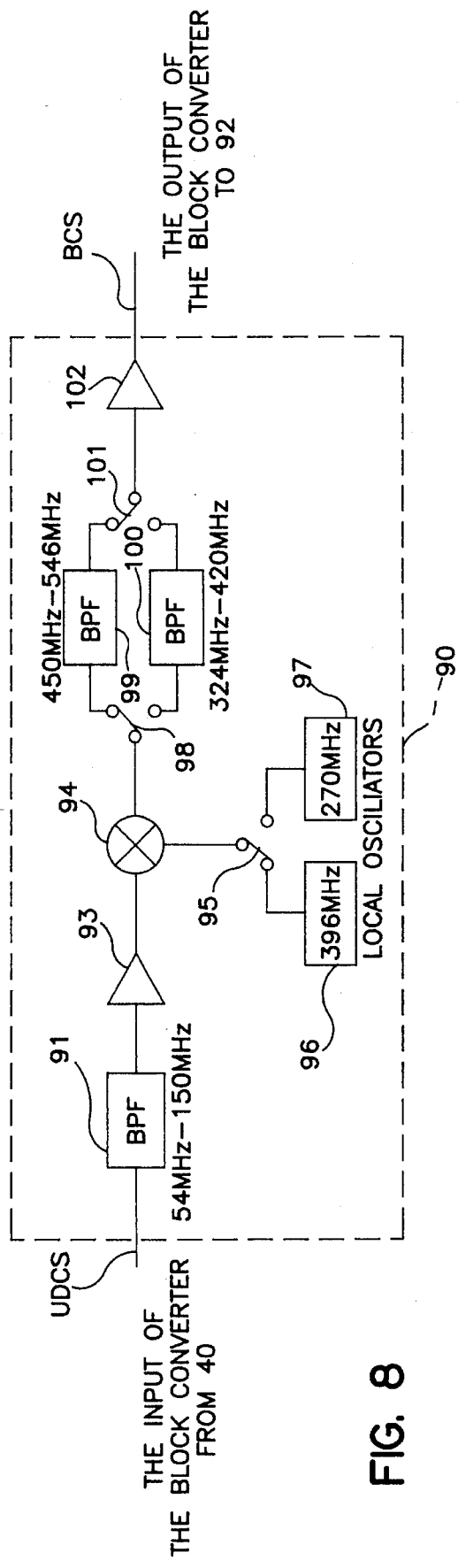
FIG. 8 is a block diagram of the block converter shown in FIG. 2.

Where: $NF_T$ is the total noise figure of the Node "0";

NF1 is the noise figure of the circuitry from the input terminal of the Input Section 30 to the output terminal of the amplifiers 33a–33d (FIG. 3);

G1 is the gain of amplifier 33a–33d;

NF2 is the noise figure of the circuitry between the output terminal of the amplifiers 32a–32d and the output terminal of amplifier 36;

G2 is the gain of amplifier 36 (FIG. 3);

NF3 is the noise figure of the circuitry between the output terminal of amplifier 36 and the output terminal of amplifier 93 (FIG. 8)

G3 is the gain of amplifier 93

From equation (1), the noise figure and the gain of the front stage 33 of Input Section 30 is the most important factor in the noise performance of the whole system. The noise figure $F_B$ of each branch a-d of the Input Section 30 for the signals (5 MHz–150 MHz) is less than 4.4 dB, and each branch a-d provides more than 31 dB gain. For the CXBus network 11 shown in FIG. 1, if the output signal level from the TV modulator is +6 dBmV and the total cable loss between the modulator 12 and Node "0" 10 is 3 dB, then the signal level arriving at Node "0" is −4 dBmV. When the signal level arriving at the Node "0" 10 is −4 dBmV, the signal level at the output port of the pre-amplifier 33a is +24.4 dBmV.

As shown in FIG. 3, a simple resistive network 34 may be used for combining the signals from the four branches a–d of the Input Section 30. Other means (e.g., a reactive network) may also be used for combining the signals. The insertion loss of resistive network 34 is about 14 dB. The signal level at the output port of the resistive combining network 34 is approximately +10 dBmV for each TV channel. The combined signals from the output of the resistive combining network 34 are fed into the second amplifier stage 36. The maximum possible power level at the input port of amplifier 36 is −13 dBm for 50 ohm impedance with 16 channels at +10 dBmV per channel (according to the CXBus network specification, the in-home generated audio/video signals ULS include not more than 16 television channels, so the maximum power level considered herein is the level corresponding to 16 TV channels).

The amplifier 36 has a noise figure of 3.6 dB, 13 dB gain for the frequency of signals less than 200 MHz, +17.5 dBm at the 1 dB compression point and +30 dBm at the third order intercept point. In the output signals of amplifier 36, the third order products are theoretically 90 dB below the signal carrier (the third order product is decreased by 3 dB for every 1 dB decrease of the input power). The output signal level of the amplified up-link signal AULS from the amplifier 36 is about +23 dBmV for the video carrier of each TV channel signal.

Without the first pre-amplifying stage 33 of the present invention, the 14 dB loss of resistive network 34 would limit the C/N ratio, so that it would not be practical to connect the Node "0" to more than four cables. By amplifying the signals in preamplifiers 33a–33d according to the invention, a much larger number of cables may be connected with good picture quality. Additionally, a simple and inexpensive resistive network 34 becomes possible when preamplifiers 33a–33d are used.

Figure 4:
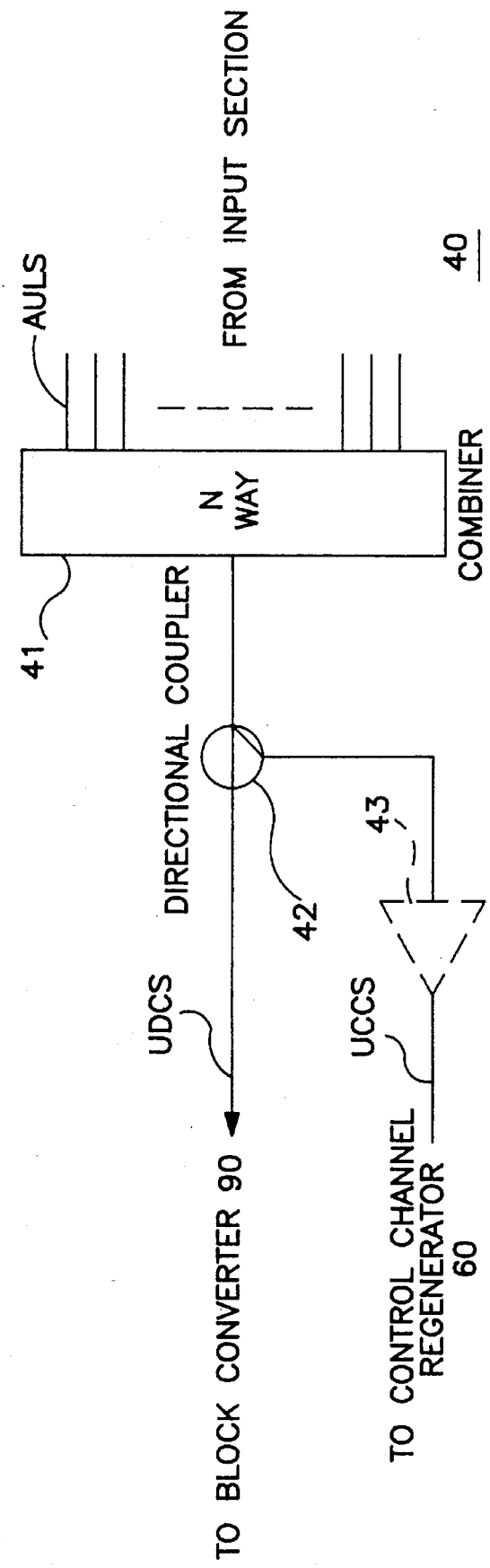
FIG. 4 is a block diagram of the Up-link data routing section shown in FIG. 2.

FIG. 4 is a block diagram of the Up-link data routing section 40. The +23 dBmV signal AULS provided by the Input Section block 30 is transmitted to the Up-link Data Routing Section 40. At the input of the Up-link Data Routing Section 40 is a passive N-way power combiner 41, where N may be a number from 1 to 16. Thus, the Up-link Data Routing Section 40 may be connected to 16 Input Section blocks identical to Input section block 30. Furthermore, because each input section block 30 may be coupled to four cable pairs 20–23, a total of up to 64 cable pairs may be connected to a single Node "0" 10. For a conventional 16-way power combiner 41, the nominal insertion loss is 14 dB. A conventional 6 dB tap out directional coupler 42 is connected to the output port of the 16-way combiner 41. The directional coupler 42 is used for separating the up-link data channel signals UDCS from the up-link control channel signal UCCS. Optionally, a third stage amplifier 43 may be provided to boost the up-link control channel signal UCCS and transmit the amplified UCCS signal to the control channel regenerator 60 (shown in detail in FIG. 6).

From equation (1) above, so long as the first stage pre-amplifiers 33a–33d of Input Section 30 (shown in FIG. 3) have high gain and a low noise figure, then the noise figures of the third stage amplifier 43 (FIG. 4) is not critical to the determination of the total noise figure $NF_T$. The third stage noise figure effects are decreased by the product of the gains of other stages in front of it. The same is true for further (fourth, etc.) amplifier stages. Thus, in an alternate embodiment, directional coupler 42 in the Up-link Data Routing Section 40 may be replaced by a 2-way splitter (not shown), without substantially impairing the quality of the audio/video signals.

The up-link data channel signals UDCS from the output port of the directional coupler 42 are transmitted to the Block Converter Section block 90.

FIG. 8 is a block diagram of the exemplary block converter 90. Block Converter 90 may be a conventional block converter device. If a 3 dB noise figure is assumed for the Block Converter 90, a 20 dB gain is assumed for the front stage and a 10 dB noise figure/insertion loss is assumed for the mixer 94 (shown in FIG. 8). The total noise figure of the Node "0" is less than 5.5 dB.

A band pass filter 91 may be provided at the input to Block Converter Section 90. An exemplary band pass filter 91 has been designed for this purpose, and is described below with reference to FIG. 9.

Filter 91 has an insertion loss for the 54 MHz –150 MHz band of less than 0.8 dB. The attenuation for frequencies above 450 MHz is greater than 60 dB, and the frequencies below 5 MHz (e.g., the UCCS signals) have more than 45 dB attenuation. Using filter 91, the signal level at the input of the Block Converter 90 is +7 dBmV. This signal is strong enough to be converted in the Block Converter 90. Band pass filter 91 attenuates and substantially filters out any of the block converted signals in the 450 to 546 MHz band that may pass back to the Up-link Data Routing Section 40.

The filtered signals from the band pass filter 91 are amplified in amplifier 93 and are passed through multiplier 94, which, along with oscillators 96 and 97, forms a conventional heterodyne system. The 54–150 MHz signals are multiplied with the 396 or 270 MHz signals from oscillator 96 or 97, respectively, to form a signal in the high (450–546 MHz) or low (324–420 MHz) band. A switch 95 selects either the low or high frequency band. For CATV signals, the up-link signals are multiplied by the 396 MHz signals from oscillator 96 to form high band signals. For Off-Air signal, the up-link signals are multiplied by the signals from 270 MHz oscillator 97, to form low band signals.

The block converted signal from multiplier 94 is provided to one of the band pass filters 99 or 100, via another switch 98. The position of switches 98 and 101 is the same as the position of switch 95. That is, either all three switches 95, 98, 101 are positioned for high band signals, or all three switches are positioned for low band signals. After passing through filter 99 or 100, any remaining undesired signal components (e.g., the 396 or 270 MHz signals, side band signals, harmonics, etc.) are more than 60 dB down relative to the video carrier of the Down-link Data Channel signals. The output signals from the selected band pass filter 99 or 100 pass through a third switch 101 to a power amplifier 102. The amplified signal BCS is then transmitted to either the Down-link Data Routing section 50 (shown in FIG. 2), or the External Cable Distribution Sections 80, depending on the position of switch 92.

Figure 9:
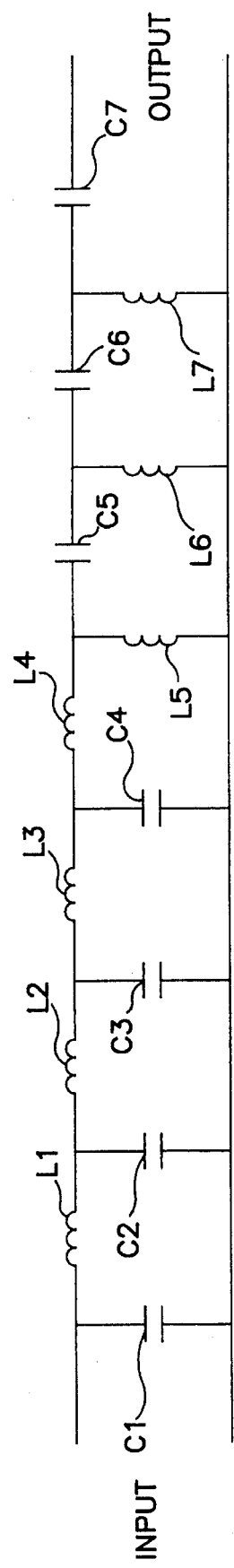
FIG. 9 is a schematic diagram of an exemplary band pass filter suitable for use in the block converter shown in FIG. 8.

FIG. 9 is a schematic diagram of an exemplary band pass filter 91 suitable for use in the block converter 90. The values for the various capacitors and inductors in the exemplary band pass filter 91 of FIG. 9 are listed below in Tables 2 and 3. It is understood by one skilled in the art that other filters may be used to provide the filtering function.

TABLE 2

| Capacitor | Capacitance (Pico-Farads) |
|---|---|
| C1 | 3.9 |
| C2 | 18 |
| C3 | 20 |
| C4 | 18 |
| C5 | 120 |
| C6 | 180 |
| C7 | 1000 |

TABLE 3

| Inductor | Inductance (nano-Henries) |
|---|---|
| L1 | 68 |
| L2 | 100 |
| L3 | 100 |
| L4 | 39 |
| L5 | 560 |
| L5 | 560 |
| L5 | 560 |

Figure 5:
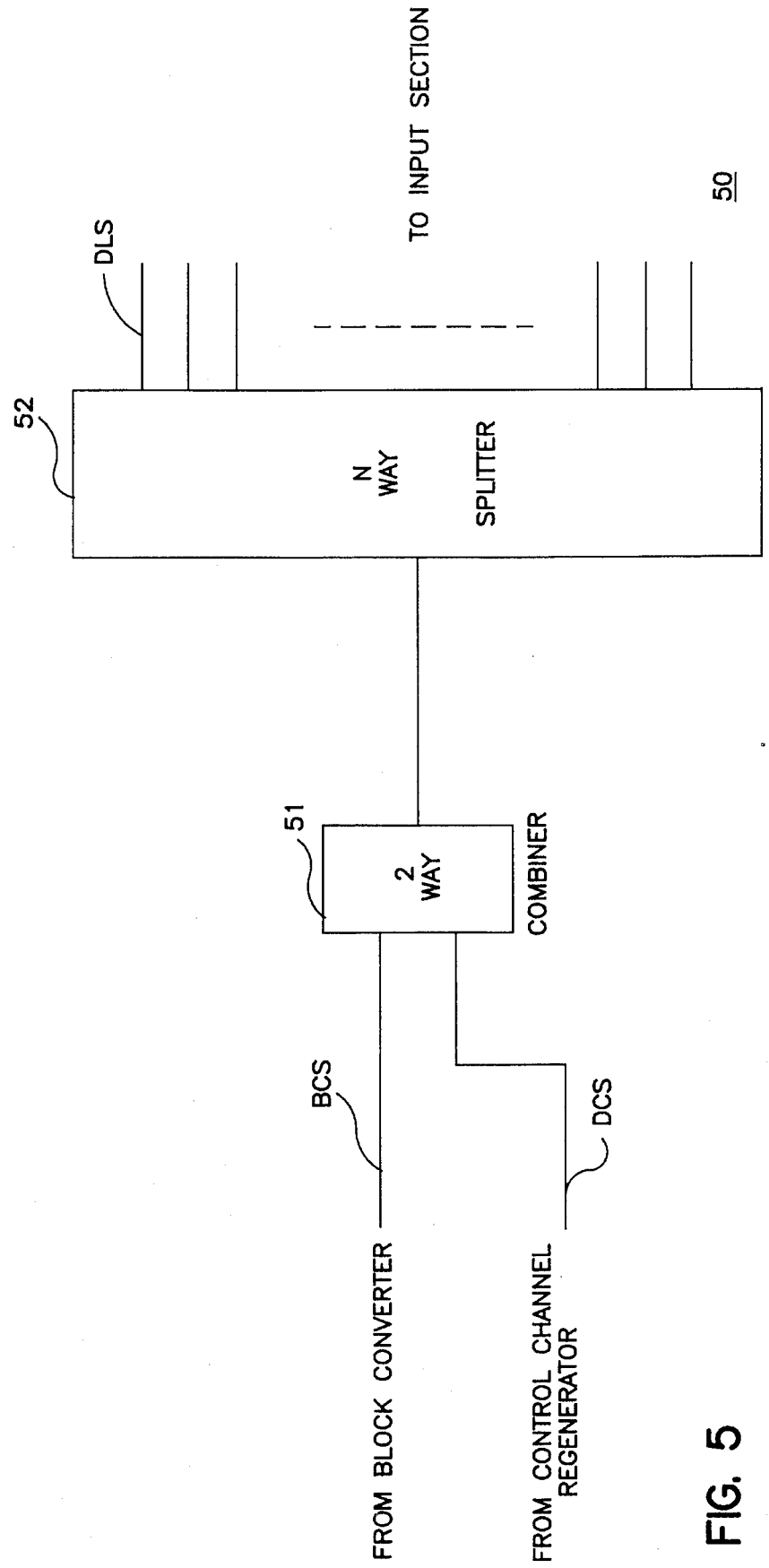
FIG. 5 is a detailed block diagram of the Down-link data routing section shown in FIG. 2.

FIG. 5 is a block diagram of the Down-Link Data Routing Section 50. Down-Link Data Routing Section 50 has two input ports for receiving the block converted output signals BCS and the Down-Link Control Channel Signal DCS from the Block Converter 90 and the Control Channel Regenerator, respectively. These input signals are combined in a two way combiner 51. The combined signal from combiner 51 is then provided to an N way splitter/combiner 52, which provides the combined signals to up to 16 Input Sections 30.

The block converted signal level must be strong enough to overcome the signal through loss caused by the Down-link Data Routing Section 50 and the Input Sections 30. In the exemplary configuration shown in FIG. 5, the through loss for the Down-link Data Routing Section 50 is 18 dB for 16 output taps. As shown in FIG. 3, the down-link output signals DLS from the Down-link Data Routing Section 50 are transmitted to the internal cable 20a–23a through a 4-way splitter 37 and the taps 39a–39d of directional couplers 31a–31d. Thus, the signal loss for the distributed signal is 13 dB. Furthermore, if the nominal level at the input of the device is +4 dBmV, then the output signal level of the block converted signals BCS from the Block Converter 90 is +45 dBmV. The standard output power for CATV headend equipment is +46 dBmV. This required power level may be easily achieved by using conventional CATV trunk amplifiers available from Motorola.

Figure 6:
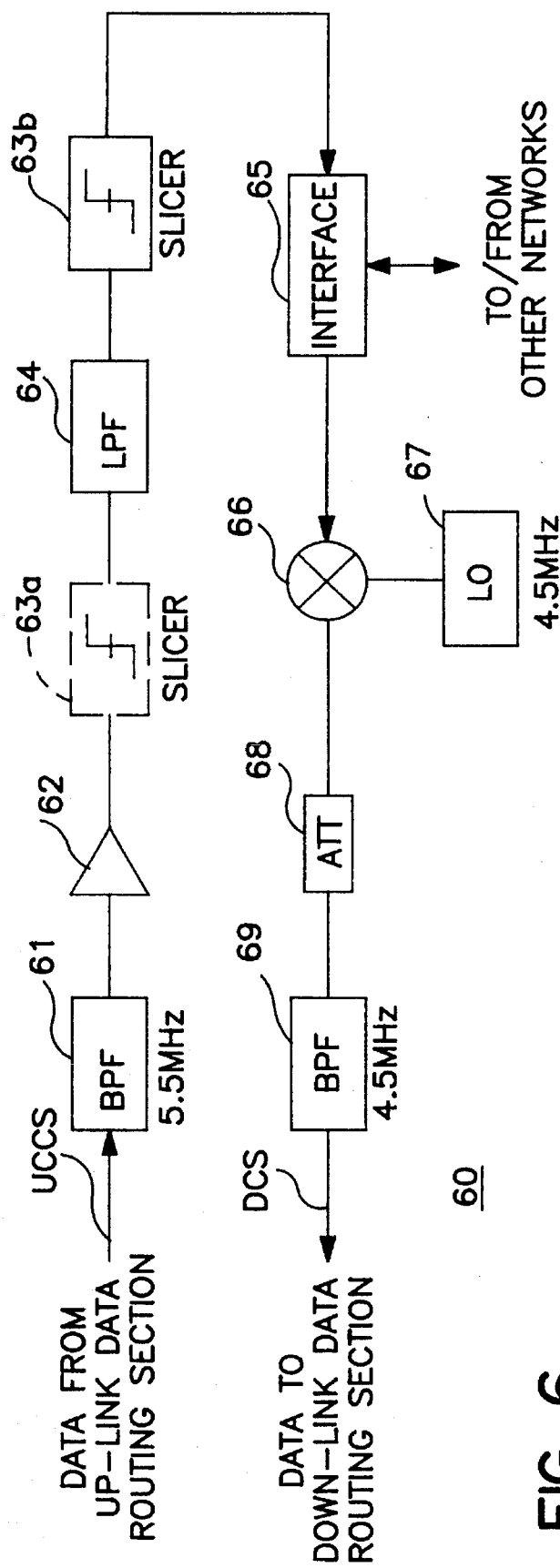
FIG. 6 is a block diagram of the control channel signal regenerator shown in FIG. 3.

FIG. 6 is a block diagram of an exemplary Control Channel Regenerator 60 used in the Node "0" 10 shown in FIG. 2. Referring now to FIG. 6, the Up-Link Control Channel Signal UCCS received by the Control Channel Regenerator 60 is passed through a 5.5 MHz band pass filter 61 to pass the 5.5 MHz control signal transmitted by devices 12 and 14 (shown in FIG. 1). The 5.5 MHz signals are amplified in amplifier 62. The signals received by amplifier 62 are generally sinusoidal. The amplifier 62 essentially squares the signal. The amplifier 62 should have sufficiently high gain so that the amplifier 62 is saturated by these signals, and the bottom and top portions of the signal are cut off. If amplifier 62 does not have sufficient gain for this purpose, an optional second amplifier 63a (shown in phantom in FIG. 6) may be added, to act as a slicer.

The signals are then filtered in a low pass filter 64, and are passed through a second slicer 63b to shape the signal into a square wave. The demodulated output signals from the second slicer 63b are provided to a network interface 65. Network interface 65 processes the UCCS signal. Also included is circuitry which passes a down-link control channel signal DCCS to the down-link Routing Section 40, as described below. Network interface 65 may also include a router 13 (shown in FIG. 1) for interfacing to another network, or a brouter 15 (also shown in FIG. 1) for interfacing to another CEBus medium (e.g., IR or RF).

As shown in FIG. 6, control data may also be received via network interface 65. The control data are used to modulate a 4.5 MHz carrier signal to form an amplitude modulated On-Off keying R/F carrier down-link signal in node 66. The amplitude modulated down-link control data signal is adjusted to a suitable signal level in attenuator 68, which also performs impedance matching. The attenuated signal is filtered in band pass filter 69. The filtered regenerated channel signal DCS is then transmitted to the Down-link Data Routing Section 50, where it is combined with the block converted output signal BCS, as described above with reference to FIG. 5.

Figure 7:
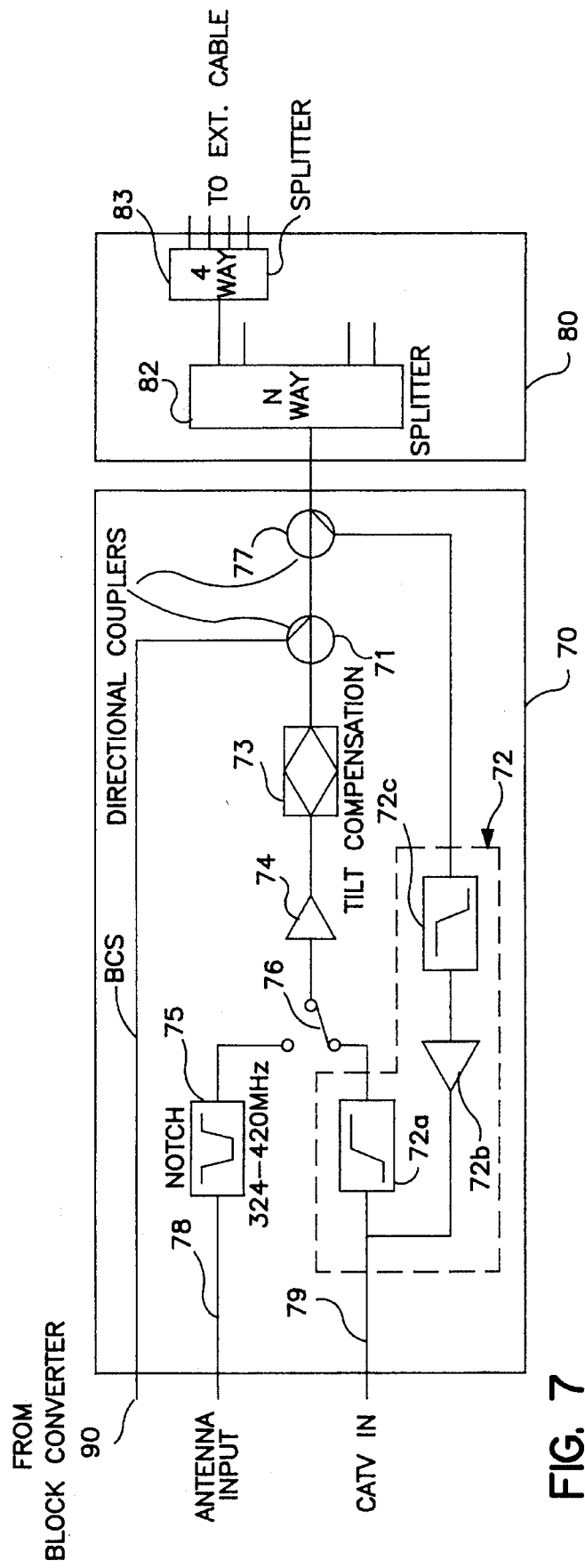
FIG. 7 is a block diagram of the CATV/Off-Air signals interface section and the external cable distribution sections shown in FIG. 2.
Figure 10:
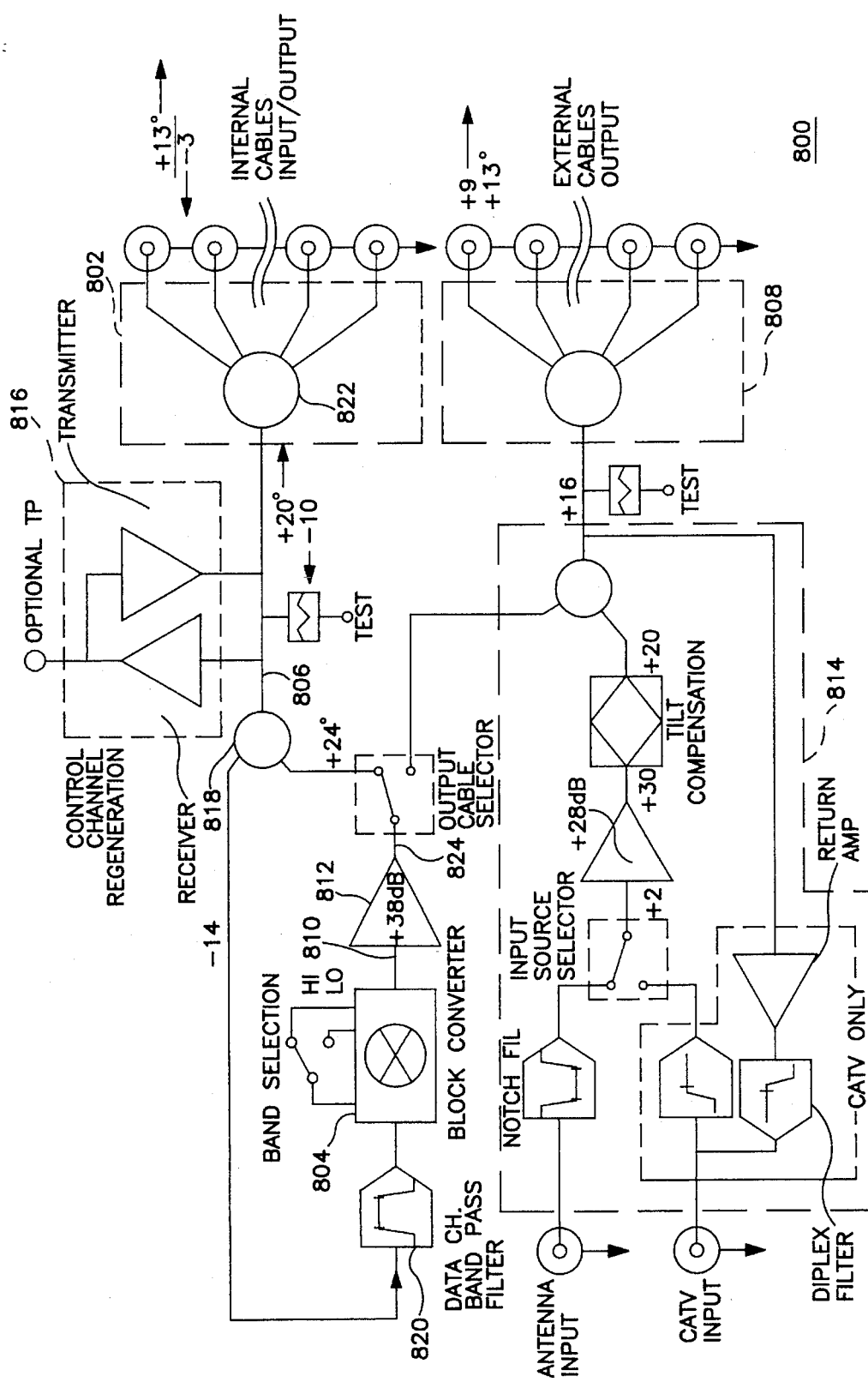
FIG. 10 (prior art) is a block diagram of a conventional Node "0" device.

FIG. 7 is a block diagram of the CATV/Off-Air signals interface section 70 and the external cable distribution sections 80 shown in FIG. 3. The CATV/Off-Air signals interface 70 is similar to the conventional interface shown in FIG. 10. The incoming CATV signals 78 are passed through a diplex filter 72a, an amplifier 74 and a tilt compensation function 73, when the input signal selection switch 76 is in a first position. Tilt compensation function 73 compensates for low-frequency cable loss of 9 dB, which corresponds to 150 feet of cable. A feedback loop including diplex filter 72c and amplifier 72b is provided. If the input signal selection switch 76 is in the second position (not shown), the Off-Air signals are used. The Off-Air signals 79 are passed through a 324 MHz–420 MHz notch filter, and are then passed through amplifier 74, and tilt compensation 73. A directional coupler 71 receives the signals from the tilt compensation function 73 or from the Block Converter 90, and provides the received signals to a further directional coupler 77. Directional Coupler 77 combines the CATV signal 79 and one of the Block Converted Down-link Signals BCS or Off-Air signals from tilt compensation function 73, and transmits the combined signals to the External Cable Distribution Sections 80.

The External Cable Distribution Sections 80 include an N way splitter 82, where N may be a number from 1 to 16. Each of the output ports of the splitter 82 is coupled to a four way splitter 83, so that up to 64 external cables may be accommodated.

When the in-home generated audio/video signals are distributed via the external cable 21b, (with switch 92 in the position shown in FIG. 2), if N is 16, an 8 dB tap loss directional coupler 71 receives the block converted signal from block converter 90. A 2 dB insertion loss is assumed for each directional coupler 71 and 81. The maximum signal through loss for the circuits shown in FIG. 7 is 31 dB. The +46 dBmV signal level from the Block Converter 90 is strong enough to achieve a +4 dBmV signal level at the receiving device.

The total noise figure for the exemplary Node "0" 10 is less than 5.5 dB with the ability to drive up to 64 coaxial cable pairs. This means that Node "0" 10 may operate with 256 coaxial attached devices when each cable e.g., 20a is terminated by a 4-way splitter/combiner 18 (shown in FIG. 1). Because the low noise figure and high gain are achieved in the Input Section 30 of the Node "0" 10, the total noise figure of the node "0" 10 does not degrade if the number of coaxial cable pair attached to the Node "0" 10 is increased. Exemplary Node "0" 10 makes a high quality in-home audio/video distribution network 11 achievable.

While the invention has been described with reference to exemplary embodiments, it is not limited thereto. Rather, the appended claims should be construed to include other variants and embodiments of the invention which may be made by those skilled in the art without departing from the true spirit and scope of the present invention.

What is claimed:

1. A signal distribution subsystem adapted for use in a Node "0" device within a Coaxial Bus network that includes a plurality of internal cables coupled to a source of up-link signals located within a first frequency band, the up-link signals including audio/video signals and control channel signals, the distribution subsystem comprising:

active input section means including a plurality of amplifiers and a plurality of filters, each amplifier coupled to a respective filter thereby forming an amplifier-filter pair, each amplifier-filter pair coupled to a respectively different one of the plurality of internal cables for individually filtering and amplifying the respective up-link signals provided by the plurality of cables and for combining the up-link signals;

block converting means coupled to the active input section means for receiving and converting the audio-video signals from the first frequency band to a second frequency band, and for transmitting the converted signals to the active input section means;

control channel regenerator means coupled to the active input section means for: (1) receiving the control channel signal, (2) generating a down-link control channel signal, and (3) transmitting the down-link control channel signal to the active input section means, wherein the converted signals and the down-link control channel signals are transmitted to the internal cables by the active input section means.

2. A distribution subsystem according to claim 1, wherein:

the plurality of filters comprise a plurality of low pass filters, each having an output terminal and being coupled to respective ones of said cables, and the plurality of amplifiers comprise a plurality of pre-amplifiers, each connected to a respective low pass filter at the output terminal thereof, whereby each low pass filter attenuates the converted signals relative to the up-link signals transmitted to the respective pre-amplifier to which that low pass filter is connected.

3. A distribution subsystem according to claim 2, wherein the active input section means includes:

a plurality of directional couplers, each having a respective tap output port that couples a respective one of the plurality of internal cables to the block converting means, by which the converted signals are transmitted to the internal cables.

4. A distribution subsystem according to claim 3, wherein each of the pre-amplifiers provides an amplified signal at an output terminal thereof, and the active input section means further includes:

a resistive network coupled to the output terminals of each of the plurality of pre-amplifiers, the resistive network combining the amplified signals.

5. A distribution subsystem according to claim 4, wherein the active input section means further includes a second stage amplifier coupled to the resistive network, the second stage amplifier receiving and amplifying the combined signals from the resistive network.

6. A signal distribution device for a Coaxial Bus network that includes: (1) a plurality of internal cables coupled to a source of up-link signals located within a first frequency band, the up-link signals including first audio/video signals and control channel signals, (2) a plurality of external cables and (3) a source of second audio/video signals located within a second frequency band, the device comprising:

active input section means including a plurality of amplifiers and a plurality of filters, each amplifier coupled to a respective filter thereby forming an amplifier-filter pair, each amplifier-filter pair coupled to a respectively different one of the plurality of internal cables for receiving, filtering, amplifying and combining the up-link signals;

block converting means coupled to the input section means for receiving and converting the first audio-video signal from the first frequency band to the second frequency band, and for providing the converted signals at an output port thereof;

control channel regenerator means coupled to the input section means (1) for receiving the control channel signal, (2) for generating a down-link control channel signal, and (3) for transmitting the down-link control channel signal to the input section means;

external cable distribution means coupled to the plurality of external cables and to the source of second audio/video signals; and switching means coupled to the input section means, the external cable distribution means and the output port of the block converting means, for transmitting the converted signals to one of the input section means and the external cable distribution means, wherein the external cable distribution means receives one of the converted signals and the second audio/video signals and transmits the received signals to the plurality of external cables.

7. A device according to claim 6, further comprising down-link data routing means coupled to the block converting means and the control channel regenerating means for combining the converted signals and the down-link control channel signals to form combined signals, and for transmitting the combined signals to the input section means.

8. A device according to claim 7, wherein:

the plurality of filters comprise a plurality of low pass filters, each having an output terminal and being coupled to respective ones of said internal cables, and the plurality of amplifiers comprise a plurality of pre-amplifiers, each connected to a respective low pass filter at the output terminal thereof, whereby each low pass filter attenuates the converted signals relative to the up-link signal transmitted to the respective pre-amplifier to which that low pass filter is connected.

9. A device according to claim 8, wherein the input section means includes:

a plurality of directional couplers, each having a respective tap output port that connects a respective one of the plurality of internal cables to a respective one of the low pass filters.

10. A device according to claim 9, wherein each of the pre-amplifiers provides an amplified signal at an output terminal thereof, and the active input section means further includes:

a resistive network coupled to the output terminals of each of the plurality of pre-amplifiers, the resistive network combining the amplified signals.

11. A device according to claim 6, wherein the external cable distribution means includes means for combining the converted signals and the second audio/video signals to form combined down-link signals, and for transmitting the combined down-link signals to the external cables.

* * * * *